Berry & Graves,
Scroll Saw.
N° 41,116. Patented Jan. 5, 1864.
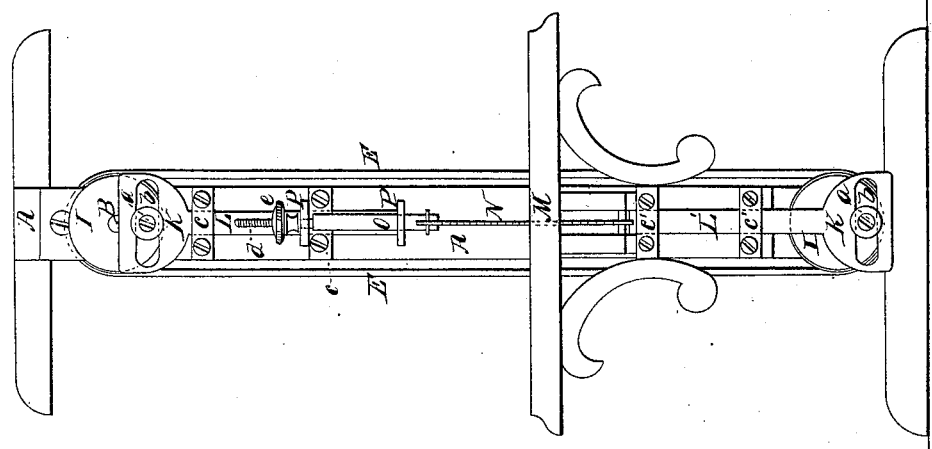
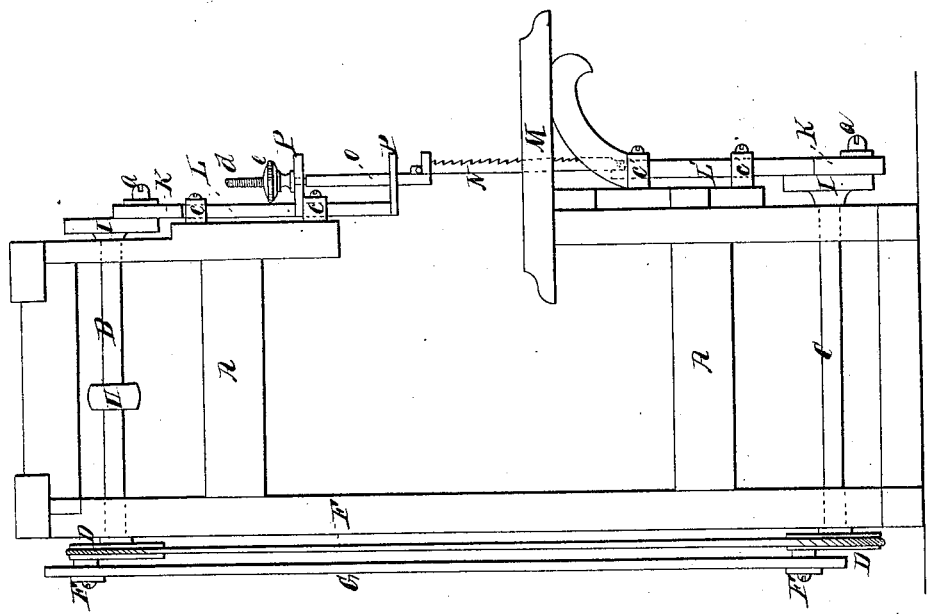
Witnesses. Inventors.

UNITED STATES PATENT OFFICE.

LEWIS M. BERRY AND NATHANIEL S. GRAVES, OF BOSTON, ASSIGNORS TO SAID LEWIS M. BERRY AND JAS. A. WOODBURY, OF WINCHESTER, MASS.

IMPROVEMENT IN JIG-SAWS.

Specification forming part of Letters Patent No. 41,116, dated January 5, 1864; antedated December 16, 1863.

*To all whom it may concern:*

Be it known that we, LEWIS M. BERRY and NATHANIEL S. GRAVES, residents of Boston, in the county of Suffolk and State of Massachusetts, have made a new and useful invention having reference to the Support and Operation of a Jig-Saw; and we do hereby declare the same to be fully described in the following specification, and represented in the accompanying drawings, of which—

Figure 1 denotes a side elevation, and Fig. 2 a front view, of a jig-saw provided with our invention, the said invention also being applicable to various other straight saws.

The nature of the said invention consists in a combination of mechanism for supporting and operating the saw, the same consisting of two separate vertical sliders, two parallel shafts, certain mechanism for connecting the shafts and sliders, and, finally, a mechanism for so connecting the two shafts as to cause one to drive the other and both to be driven at the same rate of speed.

And our invention further consists in the combination of machinery for straining the saw with the mechanism for supporting and moving it, as described.

And our invention further consists in the combination and arrangement of an endless band and two pulleys and two cranks or crank-pins and a connecting-rod, the same being applied to the two shafts of the saw and for the purposes of causing each of them to rotate in the same direction.

In the drawings, A represents a frame for supporting the two shafts B C, one of which is arranged in the upper and the other in the lower part of such frame. These shafts are to be parallel to one another, and each at its outer end has a grooved pulley, D, affixed on it. An endless belt, E, works around the two pulleys. A crank-pin, F, projects from the side of each pulley and extends through a connecting-rod, G. When the upper shaft may be put in revolution by a belt going around a pulley, H, fixed on such shaft, the lower shaft will be put in revolution with a like speed; but were it not for the endless belt E of the two pulleys the said connecting-rod in passing the dead-center would be as apt to cause the lower shaft to revolve in a direction opposite to that of the upper shaft as to make it revolve in the same direction. It is necessary that the two shafts while revolving should move in the same direction. On the inner end of each shaft there is a crank-wheel, I, from which a crank-pin, *a*, projects and enters a slot, *b*, made horizontally in a plate, K. From the upper plate K a slider, L, extends downward vertically through two boxes, *c c*, arranged on the frame A, as shown in the drawings. A similar slider, L', projects upward from the lower plate K and through boxes *c' c'*, affixed to the frame A, and beneath a table or platform, M, through which the saw N extends, as shown in the drawings. The foot of the saw is fastened to the upper end of the slider L', the head or upper end of the saw being sustained by the foot of an auxiliary slider, O, which not only extends upward through two ears, P P, projecting from the slider L, but has a screw, *d*, and a straining-nut, *e*, arranged on such screw and on the upper one of the ears P P, in manner as shown in the drawings. By means of the said screw and nut and auxiliary slider the saw may be duly strained between the two sliders L L'. The axis of each of the crank-pins *a a* is to be at the same radial distance from the axis of its shaft, in order that during the revolutions of the two shafts both of the sliders L L' shall have like and equal movements.

From the above it will be seen that by putting the upper shaft in revolution reciprocating vertical rectilinear movements will be imparted to the saw.

Heretofore it has been customary to affix the upper end of a jig-saw to a spring, which served not only to strain the saw, but to lift it after each downward movement of it. The spring is objectionable, because the strain which it exerts on the saw is so much power to overcome in pulling the saw downward. Besides this, the spring allows the saw to waver or tremble more or less, and thus causes it to cut unevenly while at work. With our mechanism the saw can be strained to any desirable extent, the relative positions of the two sliders L L', or their distances asunder, being always the same. So, also, the shafts B C may be of any desirable length, so as to obtain all the room that may be wished for to turn a piece of work around on the table M.

We claim—

1. The combination of mechanism for supporting and operating the saw, the same consisting not only of the separate vertical sliders L L', the two parallel shafts B C, and the cranked wheels I I and slotted plates K K, (or mechanism for connecting each of the shafts and its slider,) but of mechanism, the pulleys D D and endless belt E, for connecting the two shafts in such manner that one may drive the other and both be driven at the same rate of speed, the whole being substantially as described.

2. In connection with the said combination, mechanism for straining the saw, the same consisting of the auxiliary slider O, the screw $d$, and nut $c$, the whole being applied as and so as to operate together, as specified.

3. The combination of the endless band E and the two pulleys D D with the connecting-rod G and its crank-pins F F, projecting from the said pulleys.

LEWIS M. BERRY.
NATHANIEL S. GRAVES.

Witnesses:
R. H. EDDY,
F. P. HALE, Jr.